3,083,202
ISOMERIZATION OF 2,6-DIMETHYLMORPHOLINE
Charles G. Summers, Charleston, W. Va., assignor to Monsanto Chemical Company, St. Louis, Mo., a corporation of Delaware
No Drawing. Filed June 6, 1960, Ser. No. 33,885
5 Claims. (Cl. 260—247)

This invention relates to the isomerization of 2,6-dimethylmorpholine and more particularly to a method of preparing 2,6-dimethylmorpholine containing a high proportion of one geometric isomer.

2,6-dimethylmorpholine exists in two modifications, one of which boils at 142–143° C. and other at 148.1 to 148.5° C. The lower boiling isomer is assumed to be the cis form. This is consistent with experimental observations because cis isomers of related structures are known which are lower boiling. They generally show a higher number of absorption bands and in this instance a higher number of absorption bands has been observed with the lower boiling isomer. Furthermore, in the 1,3-disubstituted cyclohexanes it had been postulated that the cis isomers should be the thermodynamically favored form. It was established experimentally that a 1,3-dimethylcyclohexane which was known to have a trans configuration was indeed less stable than the lower boiling isomer. In the case of the 2,6-dimethylmorpholines which are also 1,3-disubstituted ring compounds, the analogy is supported by the observation that upon prolonged refluxing of the mixed isomers the higher boiling component gradually disappeared without change in the lower boiling component. Hereinafter the lower boiling isomer will be designated "cis."

This invention provides a method for obtaining a product containing a high proportion of cis isomer. It is important for certain industrial uses to obtain a high proportion of a single isomer. For example, 2,6-dimethylmorpholine is an intermediate for the preparation of the rubber vulcanization accelerator, 2-(2,6-dimethylmorpholinylthio)benzothiazole. This accelerator is a high melting stable product when prepared from either pure isomer. The melting points are cis, M.P. 104.5° C., and trans, M.P. 108.0° C., respectively. However, the usual synthetic methods for dimethylmorpholine yield a mixture of isomers and use of these mixtures lowers the melting point of the sulfenamide and introduces other complications into the processing. As illustrative of the lowering of the melting point, the isomers of 2,6-dimethylmorpholine were separated by careful fractional distillation, the sulfenamides prepared from the pure isomers and then mixed in definite proportions and melting points determined. From a melting point curve constructed from the data it was observed that the melting point was lowered approximately 1° C. for each 5% of the other isomer added. Products prepared directly from mixed isomers melt even lower, probably due to the presence of small amounts of other ingredients in addition to aforementioned isomers. For example, a product prepared from a mixture containing by analysis approximately equal parts of cis and trans isomers melted below 80° C. The low melting point is not only objectionable pre se but introduces complications in manufacture. During the oxidation step the particles adhere to form large agglomerates which entrap reactants and other extraneous materials. Washing and drying thereupon become exceedingly difficult if not impossible.

It has been found, however, that heating the mixed isomers with an excess of sulfuric acid at 185–220° C. increases the cis content. These are not the absolute operating limits but below 185° C. the reaction becomes too slow to be practical and above 220° C. decomposition becomes excessive. The preferred range is 190–210° C. with optimum temperature about 200° C. By excess of acid is meant sufficient acid to neutralize the amine and render the composition distinctly acidic and more particularly, more than one mole of acid per mole of amine. The acid also serves as a convenient reaction medium.

An analytical method based upon infrared analysis was found convenient for following the isomerization. By repeated fractional distillation samples of cis and trans isomers were prepared to serve as standards. Samples were then examined with a Perkin-Elmer Model 21, double beam infrared spectrometer. To obtain the calibration curves it was assumed that the sample of the trans isomer was pure because a higher boiling component can usually be isolated in purer form by fractional distillation. The absorption band at 9.65 microns was selected as the analytical wave length. In the case of the cis isomer it was assumed that it contained a small proportion of the trans isomer. The absorption band at 9.25 microns was selected as the analytical band. On making the correction based on the assumption that a weak band at 9.65 microns was due to the trans isomer, the trans content of the cis isomer was found to be 9.76%. Accordingly, calibration data obtained for the cis isomer were corrected for the trans contamination present. Unknown compositions were then analyzed by infrared absorption of a carbon tetrachloride solution at 9.25 microns and 9.65 microns against pure carbon tetrachloride in the compensation cell. The amounts of the two isomers were determined from the calibration curves by the method of successive approximations.

As an example of the invention 161 parts by weight of dimethylmorpholine containing 68.1% cis isomer and 32.4% trans isomer was admixed with 300 parts by weight of 96% sulfuric acid and 25 grams of water. The mixture of isomers was heated for four hours at 200° C., separated from the acid and analyzed for cis and trans content by the infrared method described. The analysis then gave 87.4% cis and 9.1% trans.

The cris-trans isomer ratio of a commercial sample of 2,6-dimethylmorpholine was determined by gas-liquid phase chromotography using a 2 meter long ¼ inch diameter column packed with a support composed of highly absorptive calcined diatomaceous silica (Johns-Manville Chromosorb W) coated with 25% by weight purified triethanolamine. Tetra(hydroxyethyl)ethylenediamine or silicone fluid may be substituted for triethanolamine. The column was maintained at approximately 130° C. with a helium pressure and flow rate of 10 pounds and 50–100 ml. per minute respectively. This cis content was 71.2% and trans 28.8%. Results of infrared analysis on a comparable sample gave 70.77% cis and 29.3% trans. To 115 parts by weight of this mixture of isomers were added 154 parts by weight of 96% sulfuric acid and 62.5 parts by weight of 33% oleum. The mixture of acid and amine was heated 2.5 hours at 200° C. after which the amine was isolated from the acid mixture and analyzed by the same method. The amine then contained 91.8% cis and 8.2% trans isomer. Comparable results were obtained from a charge composed of 166 parts by weight of the same commercial mixture is isomers, 186 parts by weight of 96% sulfuric acid and 110 parts by weight of 33% oleum which was heated 3 hours at 200° C. Analysis gave 90.4% cis and 9.4% trans isomer.

In another example of the invention 161 parts by weight of 2,6-dimethylmorpholine containing 71.2% cis and 28.8% trans isomer was mixed with 140 parts by weight of 96% sulfuric acid and 20 parts by weight of water. The charge was heated to 200° C. at which temperature there was added a mixture of 160 parts by weight of 96% sulfuric acid and 25 parts by weight of water. The resulting charge was heated 4 hours at 200° C. Dimethylmorpholine was recovered in 96% yield containing 94.9% cis and 5.1% trans isomer.

The conditions for isomerization are suitable for ring closure of diisopropanolamine to 2,6-dimethylmorpholine. The proportions of acid and base are in fact conventional. Therefore, the process of the invention may be carried out in a single step starting from diisopropanolamine to synthesize 2,6-dimethylmorpholine high in cis content. Surprisingly, the process produces high yields as well as product high in cis content although the conditions differ from those heretofore used for the dehydration. Dehydration of alkanolamines was thoroughly studied by early investigators who reported optimum conditions were heating 7 to 8 hours at 160–180° C. with sulfuric acid. While these conditions result in satisfactory yield of 2,6-dimethylmorpholine, the product contains substantial proportions of both isomers. As illustrative of the effect of temperature on the product produced, concentrated sulfuric acid was heated with diisopropanolamine in the molar ratios and for the times and temperatures indicated in the table below. Sulfuric acid (93–96%) was charged into the reactor and with cooling and stirring diisopropanolamine added at a rate such that the temperature of the solution did not exceed 80° C. The clear solution was then heated at the desired temperature and water collected in a trap. After reaction was complete the mixture was neutralized with 25–50% sodium hydroxide. At this point two phases separated and the product was recovered by any of several methods. For example, the neutralized amine mixture was distilled directly to yield 30–40% aqueous amine. Water was removed by azeotropic distillation with benzene. The benzene solution was then distilled by fractional distillation to isolate 2,6-dimethylmorpholine. The isomer content was determined by gas-liquid phase chromotography. In experiment No. 10 a mixture of 97% sulfuric acid and 30% oleum was used in a ratio of 71.1/29.9 parts by weight.

| Experiment No. | $H_2SO_4$/Diisopropanolamine, Moles | Heating Time, Hrs. | Temp., °C. | Yield 2,6-dimethylmorpholine, Percent | Cis, Percent | Trans, Percent |
|---|---|---|---|---|---|---|
| 1 | 2.1 | 5 | 160–170 | 95.1 | 71.3 | 28.7 |
| 2 | 2.1 | 3 | 180–185 | 98.6 | 77.0 | 21.1 |
| 3 | 1.0 | 4 | 200 | 46.2 | 69.1 | 30.7 |
| 4 | 1.7 | 4 | 200 | 92.5 | 89.0 | 10.8 |
| 5 | 2.1 | 3 | 200 | 94.6 | 88.4 | 11.6 |
| 6 | 2.1 | 5 | 200 | 92.1 | 92.5 | 7.5 |
| 7 | 2.2 | 2 | 200 | 91.0 | 90.9 | 9.2 |
| 8 | 2.2 | 3 | 200 | 98.0 | 93.1 | 6.9 |
| 9 | 2.2 | 4 | 200 | 92.0 | 92.0 | 8.0 |
| 10 | 2.3 | 4 | 200 | 91.0 | 91.2 | 8.7 |
| 11 | 2.1 | 3 | 220 | 83.0 | 89.9 | 10.1 |

The concentration of acid charged can vary considerably as would be expected when operating at temperatures of 185–220° C. because water is removed anyway. As is well known an excess of acid must be used to effect ring closure and this is also necessary for isomerization.

It is intended to cover all changes and modifications of the examples of the invention herein chosen for purposes of disclosure which do not constitute departures from the spirit and scope of the invention.

What is claimed is:

1. The method of increasing the cis content of a mixture of cis and trans-2,6-dimethylmorpholine which comprises heating the mixture with an excess of concentrated sulfuric acid at 185–220° C., the mole ratio of acid to amine being greater than one and heating for a time sufficient to increase the cis content.

2. The method of increasing the cis content of a mixture of cis and trans-2,6-dimethylmorpholine which comprises heating one mole of the mixture with at least 1.7 moles of sulfuric acid at 190–210° C. for a time sufficient to increase the cis content.

3. In the method of increasing the cis content of a mixture of cis and trans isomers of 2,6-dimethylmorpholine by dehydrating diisopropanolamine with concentrated sulfuric acid the improvement which consists in carrying out the dehydration at 185–220° C. and continuing the heating at said temperature for a period of at least two but not more than five hours whereby the cis content of the product is increased.

4. In the method of increasing the cis content of a mixture of cis and trans isomers of 2,6-dimethylmorpholine by dehydrating diisopropanolamine with fuming sulfuric acid the improvement which consists in carrying out dehydration at about 200° C. and continuing the heating at said temperature for a period of at least two but not more than five hours whereby the cis content of the product is increased.

5. The method of increasing the cis content of a mixture of cis and trans-2,6-dimethylmorpholine which comprises heating the mixture with an excess of fuming sulfuric acid at 185–220° C., the mole ratio of acid to amine being greater than one and heating for a time sufficient to increase the cis content.

References Cited in the file of this patent
UNITED STATES PATENTS

| 615,488 | Knorr | Dec. 6, 1898 |
| 2,776,972 | Laemmle | Jan. 8, 1957 |
| 2,777,846 | Laemmle | Jan. 15, 1957 |